United States Patent
Crain et al.

(10) Patent No.: US 9,810,350 B1
(45) Date of Patent: Nov. 7, 2017

(54) FUEL SYSTEM COMPONENTS

(71) Applicant: VORBECK MATERIALS CORP., Jessup, MD (US)

(72) Inventors: John M. Crain, Washington, DC (US); John S. Lettow, Washington, DC (US); Kate Redmond, Baltimore, MD (US)

( * ) Notice: Subject to any disclaimer, the term of this patent is extended or adjusted under 35 U.S.C. 154(b) by 0 days.

(21) Appl. No.: 15/451,479

(22) Filed: Mar. 7, 2017

Related U.S. Application Data

(63) Continuation of application No. 12/936,676, filed as application No. PCT/US2009/039697 on Apr. 6, 2009, now Pat. No. 9,625,062.

(60) Provisional application No. 61/123,354, filed on Apr. 7, 2008.

(51) Int. Cl.
  *F16L 11/04* (2006.01)
  *F16L 11/127* (2006.01)
  *F16L 11/02* (2006.01)

(52) U.S. Cl.
  CPC ............. *F16L 11/127* (2013.01); *F16L 11/02* (2013.01); *F16L 11/04* (2013.01); *Y10T 137/7036* (2015.04)

(58) Field of Classification Search
  CPC ......... Y10T 137/6851; Y10T 137/7036; C01B 31/0469; C01B 31/0476; F16L 11/04; F16L 11/127
  USPC .... 137/343, 375; 428/35.7, 35.8, 36.4, 36.6, 428/36.8, 36.9, 36.91, 36.92
  See application file for complete search history.

(56) References Cited

U.S. PATENT DOCUMENTS

| | | | | |
|---|---|---|---|---|
| 5,718,957 | A * | 2/1998 | Yokoe | B29C 47/0023 138/118.1 |
| 6,677,015 | B2 * | 1/2004 | Himmelmann | C08G 73/028 428/35.7 |
| 7,071,258 | B1 * | 7/2006 | Jang | B82Y 30/00 423/445 B |
| 8,278,757 | B2 * | 10/2012 | Crain | C09C 1/46 174/257 |
| 8,449,959 | B2 * | 5/2013 | Aksay | C08J 5/046 428/221 |
| 9,625,062 | B2 * | 4/2017 | Crain | F16L 11/06 |
| 2005/0205847 | A1 * | 9/2005 | Dailly | B82Y 30/00 252/378 R |
| 2007/0092432 | A1 * | 4/2007 | Prud'Homme | C01B 31/043 423/448 |
| 2007/0131915 | A1 * | 6/2007 | Stankovich | C01B 31/0423 252/511 |
| 2012/0244333 | A1 * | 9/2012 | Aksay | D01F 1/09 428/221 |

* cited by examiner

*Primary Examiner* — Michael R Reid
*Assistant Examiner* — Jonathan Waddy
(74) *Attorney, Agent, or Firm* — Trentice V. Bolar, Esq.

(57) ABSTRACT

Embodiments of the present invention relate to fuel system components comprising polymer compositions containing functionalized graphene sheets. In one embodiment, the fuel system component can comprise a plurality of layers affixed to the fuel system component comprising one or more first layers and one or more second layers. The fuel system component in direct contact with one or more fuels or provides one or more paths to ground from one or more second components that is in direct contact with flowing fuel. The fuel can be a liquid fuel. Each first layer can comprise at least one of a metal, a fiber, and a woven material. Each second layer can comprise a composition of one or more polymers and fully exfoliated single sheets of graphene having a carbon to oxygen molar ration of at least 50:1.

16 Claims, No Drawings

FUEL SYSTEM COMPONENTS

CROSS-REFERENCE TO RELATED APPLICATIONS

This application is a continuation of U.S. patent application Ser. No. 12/936,676, filed Jan. 27, 2011, which is a National Stage Entry of International Application PCT/US09/39697, filed Apr. 6, 2009, which claims priority to U.S. Provisional Application No. 61/123,354 filed Apr. 7, 2008. These applications are hereby incorporated herein by reference in their entirety.

TECHNICAL FIELD

Background

The present invention relates generally to fuel system components comprising polymer compositions containing functionalized graphene sheets. The components used in conveying fuel within fuel systems (such as automotive and other vehicular fuel systems) and between fuel systems and storage tanks or the like have traditionally been made from metals, however, it can be desirable to make such components from polymeric materials because of their light weight and ability to be formed into intricate parts. The use of polymeric materials also allows for significant flexibility in part design change, as tooling costs can be lower than for metal systems and mold designs may be easily altered. Polymeric materials can also easily be formed into seamless articles that have lower likelihoods of leaking than articles containing seams. Suitable polymeric materials may have several desirable properties. It is desirable that polymeric fuel system components that are in direct contact with the fuel have good permeation resistance to and do not degrade significantly in the presence of the fuel. It is desirable that components, and in particular, those that are exposed to the environment outside the device being operated using the fuel system (such as a vehicle), have good impact resistance. Additionally, since fuel system components are often exposed to elevated temperatures, as when, for example, they are used in the engine compartment of a vehicle, it is frequently desirable that the polymeric materials retain their properties at elevated temperatures.

Furthermore, since buildup of electrostatic charge on fuel system components can lead to sparking and can create an explosion hazard, the use of static dissipative electrically conductive polymeric materials is often advantageous. In fact, regulations in most countries require vehicular fuel system component to have static dissipative properties. Many components are also exposed to road salt and other materials that can lead to the degradation of the polymers during use, making the use of chemically resistant materials desirable.

It would therefore be desirable to obtain a polymeric material that has a combination of static dissipative properties, fuel permeation resistance, good impact and chemical resistance, and good retention of physical properties at elevated temperatures that can meet the requirements of many fuel system components.

SUMMARY

Disclosed and claimed herein are fuel system components comprising a polymer composition, comprising at least one polymer and functionalized graphene sheets. Further disclosed and claimed herein is a method of providing fuel to a power source, comprising the step of conveying fuel from a storage tank via a path wherein the fuel comes into contact with a fuel system component comprising a polymer composition comprising at least one polymer and functionalized graphene sheets.

DETAILED DESCRIPTION

By "fuel system component" is meant a component of the fuel system used in a piece of equipment or vehicle where the component is in direct contact with liquid or vapor/gaseous fuel, including flowing fuel, stored fuel, and the like, or has a function of providing a path to ground from a component that is in direct contact with flowing fuel. The components may be part of a fuel tank filling system and/or the delivery system that conveys fuel from a vehicle or equipment fuel storage tank to an engine or other power source. The components will preferably be components that have an inner surface that is contact with fuel and at least a portion of the surface that is in contact with fuel may comprise the polymer compositions used in the present invention. The outer surface may be exposed to the exterior of the vehicle or equipment and/or comprises an exterior surface of the vehicle or equipment or may be fully or partially encased in another component of the vehicle or equipment. In an alternative embodiment the fuel system components of the invention provide a path to ground for static electricity but do not typically contact fuel.

The fuel system components may be used in any equipment or vehicle possessing a power source using chemical fuels, such as an internal combustion engine, turbine engine, fuel cell, or the like. Examples of equipment and vehicles include cars, trucks, motorcycles, all-terrain vehicles, lawnmowers, tractors and other farm equipment, construction equipment, marine vehicles (such as power boats and personal watercraft vehicles), snowmobiles, chain saws, garden and landscaping equipment, portable and stationary power generators, aircraft (including helicopters), fuel-powered toys, and the like. The power source may run on any suitable kind of fuel, including gasoline, diesel fuel, biodiesel fuel, jet fuel, alcohols, alcohol-containing fuels (including alcohol-containing gasoline), hydrogen, natural gas, other hydrocarbon gases, and the like.

Preferred components include fuel lines and tubing, fuel tank filler pipes and connectors, fuel line connectors, fuel pumps, fuel pump and delivery module components, fuel injector components, and fuel filter housings. In an alternative embodiment the preferred components may also include fuel line grounding clips, fuel tank flanges, fuel filter clamps, fuel tank caps, and components comprising heat dissipation elements, such as heat sink fins.

The fuel system components comprise polymer compositions comprising at least one polymer and high surface area functionalized graphene sheets (also referred to herein as "FGS").

The FGS are graphite sheets having a surface area of from about 300 to about 2,630 $m^2/g$. In some embodiments of the present invention, the FGS primarily, almost completely, or completely comprise fully exfoliated single sheets of graphite (often referred to as "graphene"), while in other embodiments, they may comprise partially exfoliated graphite sheets, in which two or more sheets of graphite have not been exfoliated from each other. The FGS may comprise mixtures of fully and partially exfoliated graphite sheets. The FGS are made by exfoliating graphite. Graphite may be treated with oxidizing and intercalating agents and exfoliated. Graphite may also be treated with intercalating agents and electrochemically oxidized and exfoliated. Preferred methods of exfoliation include thermal exfoliation. The graphite may be any suitable type, including natural, Kish, and synthetic graphites and graphitic materials such as graphitic carbon fibers (including those derived from polymers), and highly oriented pyrolytic graphite.

In a preferred method for the preparation of FGS, graphite is oxidized to graphite oxide, which is then thermally exfoliated to form high surface area FGS that are in the form of thermally exfoliated graphite oxide, as described in US 2007/0092432, the disclosure of which is hereby incorporated herein by reference. The thusly formed thermally exfoliated graphite oxide may display little or no signature corresponding to graphite or graphite oxide in its X-ray or electron diffraction patterns.

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, and the like. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. A preferred intercalation agent includes sulfuric acid. Graphite may also be treated with intercalating agents and electrochemically oxidized.

The FGS used in the present invention preferably have a surface area of from about 300 to about 2,630 $m^2/g$, or more preferably from about 350 to about 2,400 $m^2/g$, or still more preferably of from about 400 to about 2,400 $m^2/g$, or yet more preferably of from about 500 to about 2,400 $m^2/g$. In another preferred embodiment, the surface area is about 300 to about 1,100 $m^2/g$. A single graphite sheet has a maximum calculated surface area of 2,630 $m^2/g$. The surface area includes all values and subvalues therebetween, especially including 400, 500, 600, 700, 800, 900, 100, 110, 1200, 1300, 1400, 1500, 1600, 1700, 1800, 1900, 2000, 2100, 2200, 2300, 2400, and 2500 $m^2/g$.

Surface area can be measured using either the nitrogen adsorption/BET method or, preferably, a methylene blue (MB) dye method.

The dye method is carried out as follows: A known amount of FGS is added to a flask. At least 1.5 g of MB are then added to the flask per gram of FGS. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the FGS. The surface area of the FGS are then calculated using a value of 2.54 $m^2$ of surface covered per one mg of MB adsorbed.

The FGS preferably have a bulk density of from about 40 to about 0.1 $kg/m^3$. The bulk density includes all values and subvalues therebetween, especially including 0.5, 1, 5, 10, 15, 20, 25, 30, 35 $kg/m^3$.

The FGS typically have an overall carbon to oxygen molar ratio (C/O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1. In some embodiments of the invention, the carbon to oxygen ratio is at least about 10:1, or at least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1; or at least about 1500:1, or at least about 2000:1. The carbon to oxygen ratio also includes all values and subvalues between these ranges.

The polymer used in the compositions used in the present invention can be at least one thermoplastic and/or thermoset polymer. Preferred polymers are thermoplastics. Examples of thermoplastics include, but are not limited to poly(phenylene oxide) (PPO), PPO-polyamide alloys, polysulphones (PSU), polyetherketones (PEK), polyetheretherketones (PEEK), polyolefins (including polyethylene, polypropylene, olefin copolymers, block copolymers (such as styrene-isoprene-styrene and styrene-butylene-styrene polymers, and the like), ethylene/vinyl alcohol (EVOH) copolymers polyimides, polyoxymethylenes (POM), polyetherimides, fluoropolymers, fluorinated ethylene propylene polymers (FEP), poly(vinyl fluoride), poly(vinylidene fluoride), poly (vinylidene chloride), poly(vinyl chloride), acrylonitrile/butadiene/styrene (ABS), styrene/acrylonitrile polymers (SAN), polystyrene (including high impact polystyrene), poly(acrylonitrile), polycarbonates (PC), polyamides (including, but not limited to, aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides (such as poly(m-xylylene adipamide) (polyamide MXD,6) and polyterephthalamides such as poly(dodecamethylene terephthalamide) (polyamide 12,T), poly(decamethylene terephthalamide) (polyamide 10,T), poly(nonamethylene terephthalamide) (polyamide 9,T), the polyamide of hexamethylene terephthalamide and hexamethylene adipamide, and the polyamide of hexamethyleneterephthalamide, and 2-methylpentamethyleneterephthalamide), polyesters (such as poly(butylene terephthalate) (PBT), poly(ethylene terephthalate) (PET), poly(1,3-propylene terephthalate) (PPT), poly(ethylene naphthalate) (PEN), and poly(cyclohexanedimethanol terephthalate) (PCT)), liquid crystalline polymers (LCP), and thermoplastic elastomers (including, but not limited to, copolyetheresters, thermoplastic polyurethanes, silicone rubbers, and fluorinated silicone rubbers). Blends, alloys, and copolymers comprising two or more of the foregoing polymers and/or other polymers may be used.

The compositions preferably comprise about 0.01 to about 20 weight percent, more about 0.1 to about 5 weight percent, and yet more preferably about 0.1 to about 3 weight percent of FGS, where the weight percentages are based on the total weight of the composition.

The compositions may further comprise electrically conductive additives other than the FGS, such as metals (including metal alloys), conductive metal oxides, polymers, carbonaceous materials other than the FGS, and metal-coated materials. These components can take a variety of forms, including particles, powders, flakes, foils, needles, etc.

Examples of metals include, but are not limited to silver, copper, aluminum, platinum, palladium, nickel, chromium, gold, bronze, and the like. Examples of metal oxides include antimony tin oxide and indium tin oxide and materials such as fillers coated with metal oxides. Metal and metal-oxide coated materials include, but are not limited to metal coated carbon and graphite fibers, metal coated glass fibers, metal coated glass beads, metal coated ceramic materials (such as beads), and the like. These materials can be coated with a variety of metals, including nickel.

Examples of electrically conductive polymers include, but are not limited to, polyacetylene, polyethylene dioxythiophene, polyaniline, polypyrrole, and the like.

Examples of carbonaceous materials other than the FGS include, but are not limited to, carbon black, graphite, carbon nanotubes, vapor-grown carbon nanofibers, carbon fibers, metal coated carbon fibers.

The compositions may further comprise additional components and additives, including, but not limited to, reinforcing agents; fillers; plasticizers; impact modifiers; flame retardants; lubricants; thermal, oxidative, and/or light stabilizers; mold release agents; and colorants.

The compositions are preferably well-mixed blends in which the functionalized graphene sheets are dispersed in the polymer. They may be formed using any means known in the art. When the polymer is one or more thermoplastics, they may be made using any suitable melt-mixing method, such as using a single or twin-screw extruder, a blender, a kneader, or a Banbury mixer. In one embodiment of the invention, the compositions are melt-mixed blends wherein the non-polymeric ingredients are well-dispersed in the polymer matrix, such that the blend forms a unified whole.

The compositions may be formed into the fuel system components using any suitable technique, including extrusion, ram extrusion, and compression molding. Melt-processing techniques are preferred and the compositions are preferably melt-blended mixtures. Examples of melt-processing methods include injection molding, extrusion, co-extrusion, rotational molding, blow molding, injection blow molding, thermoforming, vacuum forming, casting, overmolding, and the like. The compositions can also be applied to a substrate in the form of a film, coating, or the like to form the fuel system components. They can be applied by spraying, for example. The compositions and/or components may the in the form of a tube or pipe, molded or extruded article, film, coating, and the like.

The fuel system components can be assembled from two or more polymeric parts using any method known in the art, including gluing, snap fitting, laser welding, friction welding, spin welding, ultrasonic welding, and the like.

The fuel system components may be in the form of multilayered structures comprising two or more layers. Two or more layers may comprise the composition used in the present invention. Layers other than those comprising the composition used in the present invention may comprise one material or two or more materials, such as additional polymeric materials, metals, fibers, woven materials, and the like. In one embodiment of the invention, in a multilayered system, the polymer-FGS composition used in the present invention is exposed to fuel in at least a portion of the fuel system component. In another embodiment, the composition is present in a portion of the component that is not exposed to fuel. In a further embodiment, the composition is present in portions of the component that are exposed to fuel and portions that are not exposed to fuel.

The components are preferably sufficiently electrically conductive to be static dissipative. For example, the components may have a surface resistivity of less than about $1 \times 10^9$ $\Omega$/square and/or a volume resistivity of less than about $1 \times 10^8$ $\Omega \cdot$cm.

What is claimed is:

1. A fuel system component, comprising:
   a plurality of layers affixed to the fuel system component comprising a first layer and a second layer; and
   wherein;
      the fuel system component in direct contact with a fuel or provides a path to ground from a second component that is in direct contact with flowing fuel; and
      the fuel is a liquid fuel;
      the first layer comprising at least one of a metal, a fiber, and a woven material; and
      the second layer comprising a composition, the composition comprising:
         a polymer;
         fully exfoliated single sheets of graphene having a carbon to oxygen molar ratio of at least 50:1; and
         a volume resistivity of less than $1 \times 10^8$ $\Omega \cdot$cm.

2. The fuel system component of claim 1 having an electrical conductivity of at least about $10^{-8}$ S/m.

3. The fuel system component of claim 1, wherein the second layer is exposed to the fuel in at least a portion of the fuel system component.

4. The fuel system component of claim 1, wherein the second layer is not exposed to the fuel in at least a portion of the fuel system component.

5. The fuel system component of claim 1, wherein the polymer comprises one or more thermoplastic polymers selected from the group consisting of a polyamide, a polyester, a polyoxymethylene, a polyimide, a poly(phenylene oxide), a polyurethane, and a fluoropolymer.

6. The fuel system component of claim 1 in the form of a fuel line or tubing.

7. The fuel system component of claim 1 in the form of a fuel tank filler pipe, a fuel tank filler connector, a fuel line connector, a fuel pump and delivery module component, a fuel pump, a fuel delivery module component, a fuel injector component, or a fuel filter housing.

8. The fuel system component of claim 1 in the form of a fuel line grounding clip, a fuel tank flange, a fuel filter clamp, a fuel tank cap, a component comprising heat dissipation elements, or a heat sink fin.

9. A fuel system component, comprising:
   a plurality of layers affixed to the fuel system component comprising a first layer and a second layer; and
   wherein;
      the fuel system component in direct contact with a fuel or provides a path to ground from a second component that is in direct contact with flowing fuel; and
      the fuel is a liquid fuel;
      the first layer comprising at least one of a metal, a fiber, and a woven material; and
      the second layer comprising a composition, the composition comprising:
         a polymer;
         fully exfoliated single sheets of graphene having a X-ray diffraction pattern that displays no signature corresponding to graphite or graphite oxide; and
         a volume resistivity of less than $1 \times 10^8$ $\Omega \cdot$cm.

10. The fuel system component of claim 9 having an electrical conductivity of at least about $10^{-8}$ S/m.

11. The fuel system component of claim 9, wherein the second layer is exposed to the fuel in at least a portion of the fuel system component.

12. The fuel system component of claim 9, wherein the second layer is not exposed to the fuel in at least a portion of the fuel system component.

13. The fuel system component of claim 9, wherein the polymer comprises one or more thermoplastic polymers selected from the group consisting of a polyamide, a polyester, a polyoxymethylene, a polyimide, a poly(phenylene oxide), a polyurethane, and a fluoropolymer.

14. The fuel system component of claim 9 in the form of a fuel line or tubing.

15. The fuel system component of claim 9 in the form of a fuel tank filler pipe, a fuel tank filler connector, a fuel line connector, a fuel pump and delivery module component, a fuel pump, a fuel delivery module component, a fuel injector component, or a fuel filter housing.

16. The fuel system component of claim 9 in the form of a fuel line grounding clip, a fuel tank flange, a fuel filter clamp, a fuel tank cap, a component comprising heat dissipation elements, or a heat sink fin.

* * * * *